Jan. 21, 1969    J. B. GUNN    3,423,754
SAMPLED RADAR SYSTEM
Filed Jan. 13, 1967    Sheet 1 of 2
FIG. 1
PRIOR ART
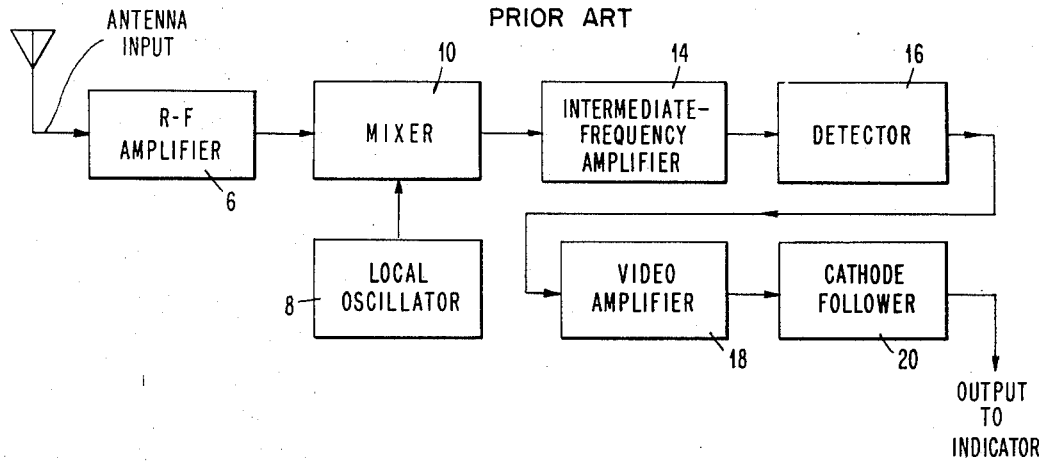
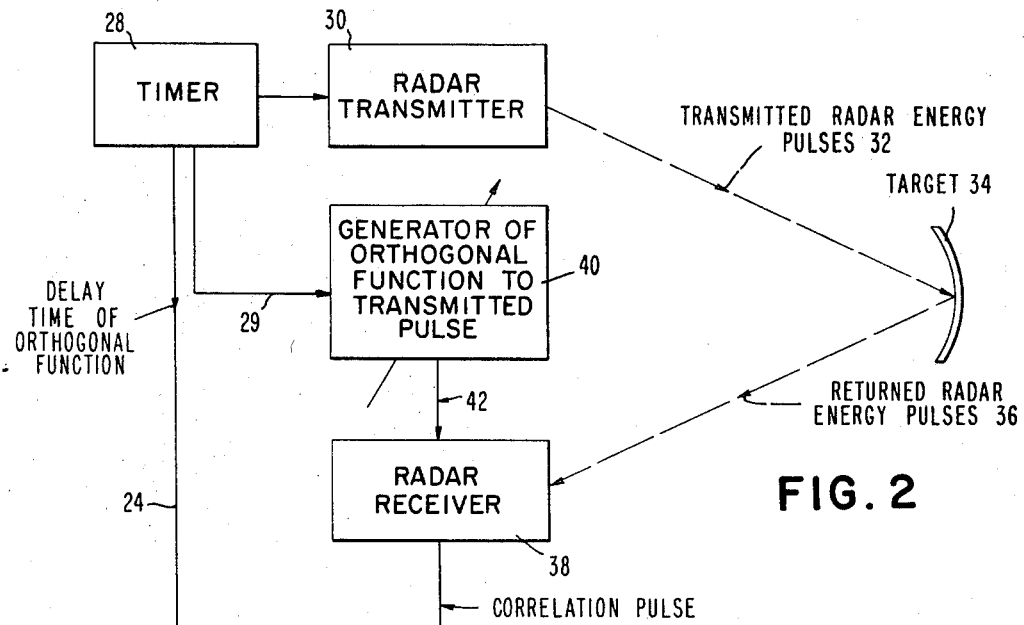
FIG. 2
INVENTOR
JOHN B. GUNN
BY Bernard N. Wiener
ATTORNEY

United States Patent Office 3,423,754
Patented Jan. 21, 1969

3,423,754
SAMPLED RADAR SYSTEM
John B. Gunn, Mount Kisco, N.Y., assignor to International Business Machines Corporation, Armonk, N.Y., a corporation of New York
Filed Jan. 13, 1967, Ser. No. 609,032
U.S. Cl. 343—17.1                    16 Claims
Int. Cl. G01s 7/28

ABSTRACT OF THE DISCLOSURE

In a radar system using conventional pulse or chirp transmitted signals, time (range) resolution exceeding the reciprocal of the intermediate frequency or video bandwidth is achieved. This is achieved by using a modulated local oscillator whose cross-correlation with the transmitted signal approximates a delta-function as closely as possible. If the timing of this local oscillator signal is varied with respect to the transmited signal, the receiver output due to a point target passes through a sharp maximum when the local oscillator pulse coincides with the received pulse. The width of this maximum is determined by the transmitter and local oscillator bandwidths, and is independent of intermediate frequency and video bandwidths. The local oscillator pulse timing may be scanned continuously to give a quasi-continuous representation of the radar return.

Introduction

This invention relates generally to radar systems and it relates more particularly to a pulse radar system for determining accurately target range.

Heretofore, pulsed radar systems have required wideband amplification over the frequency spectrum of the pulse returned from a target, for high resolution of target range. This amplification requirement imposes stringent operational conditions on the circuitry of the radar receiver. Sometimes these operational conditions are not realizable for desired target range determination.

Radio navigation systems and radars include means for extracting time, hence range, information from a radar return. In pulsed radar, the signal that is transmitted to a target is a powerful radio frequency pulse having a timewidth T, e.g., of a microsecond or less. Receiver detection apparatus for the echo pulse from the transmitted pulse often must provide accurate time resolution. A video bandwidth $B=1/T$ is required, and thus very wide bandwidth amplifiers are needed in the receiver for pulses of very short length T, which are either unavailable or are very complicated and expensive.

Conventionally, a cathode ray oscillograph is employed to display visually signal waveforms having high rates of change. It usually has a vertical deflection circuit to which a signal voltage is applied as well as a horizontal sweep circuit for horizontally deflecting an electron beam therein to obtain a visible display of the waveform of the signal. The deflection repetition occurs with an integral frequency relationship to the repetition rate of the waveform being displayed. Such oscilloscopes are not able to respond satisfactorily to very high frequencies or rates of change of voltages.

A sampling cathode ray oscilloscope is able to cope with rapidly changing ultra-high frequency signals. The amplitude of repetitive high frequency pulses is sampled in a sampling oscilloscope at predetermined intervals from the start of a pulse. Different parts of sequential signal waveforms are displayed and a reconstructed picture or trace of the original high frequency pulse is obtained. Through use of a signal sampling oscilloscope, highly time-resolved information can be obtained about repetitive base-band signals without requiring amplification over the whole frequency spectrum occupied by the signal. Illustrative sampling oscilloscopes are described in an article by R. M. Sugarman in Review of Scientific Instruments, volume 28, Number 11, November 1957, at page 933 et seq. and in U.S. Patent No. 2,939,038 to A. S. Farber that issued May 31, 1960.

The following are brief descriptions of terminology used herein.

*Orthogonal functions.*—Two functions $f(t)$, $g(t)$ are orthogonal with respect to an intermediate angular frequency $\omega_i$ if $$Re \int_{-\infty}^{\infty} f(t)g^*(t+\tau) \exp(-j\omega_i t)dt = \delta(t)$$

*Chirp functions.*—A chirp function $C(t)$ is one having the form $$((t) = Re[A(t)\exp\{j\omega(t)\}])$$

where $A(t)$, $\omega(t)$ are slowly changing functions.

*Baseband signals.*—A baseband signal is one having a frequency spectrum whose half width is of the same order as its mean value.

*Target range.*—Target range is the time delay between transmission and reception of a signal echo from a target, multiplied by the velocity of light.

Objects

It is an object of this invention to utilize signal sampling for obtaining highly time-resolved information about repetitive radar return signals without requiring amplification over the whole frequency spectrum of the signal.

It is another object of this invention to provide a method for extracting range data with high resolution from a radar return.

It is another object of this invention to utilize a radar return signal sampling technique wherein the transmitter is modulated with a sufficiently short pulse width to provide the desired resolution in range and the radar return is processed by a correlation technique to extract the time at which a given reflection of the transmitter pulse occurs.

It is another object of this invention to accomplish the preceding object by multiplying the radar return signal by a sampling local oscillator pulse to produce a correlation pulse as indication of the presence of the cross-correlation therebetween.

It is another object of this invention to use a sampling signal which is modulated so as to produce a signal approximately orthogonal to the transmitter pulse and with a variable time delay after it.

The foregoing and other objects, features, and advantages of the invention will be apparent from the following more particular description of preferred embodiments of the invention, as illustrated in the accompanying drawings.

FIG. 1 is a block diagram illustrative of the technology of the prior art.

FIG. 2 is a block diagram presenting the features of an embodiment for the practice of this invention.

Figure 4:
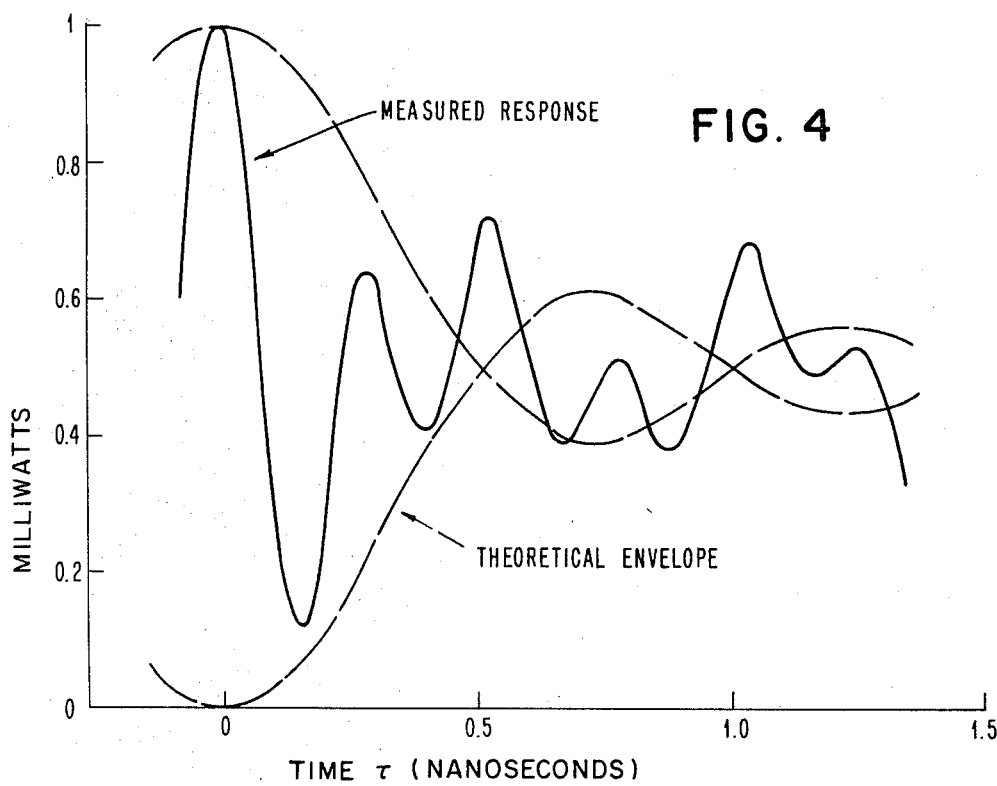

FIG. 4 presents exemplary data indicating that the correlation function between two orthogonal chirp functions has a narrow correlation function, although the chirp functions have considerably greater time duration.

Description of invention

Generally, this invention provides a radar system which has a transmitter for radiating a first train of high-frequency signals, and a receiver for receiving target-produced echos of signals of the first train. There are included in the radar system means for generating a second train of high-frequency signals, each signal of the second train being delayed by a controllable time interval with respect to a respective signal in the first train, and means for detecting the time coincidence of the target-produced echos with respective signals of the second train to indicate the presence of a target at a range corresponding to the delay time interval.

The signals of said first and second trains may be pulse modulated sinusoidal signals. More particularly, such pulse modulation may be rectangular in shape. Alternatively, chirp function signals, e.g., linear chirp function signals may be used.

It is usually desirable to have corresponding signals of the first and second trains which are approximately orthogonal with respect to an intermediate angular frequency $\omega_i$. However, if the transmitted pulses are distorted by the target, it is often desirable to have the signals of the second train be approximately orthogonal to the target-produced echo signals with respect to the intermediate angular frequency. Alternatively, it may be more convenient to have the receiver include means for processing the target-produced echo signals to render them approximately orthogonal to the respective signals of the second train with respect to the intermediate angular frequency.

A radar system for the practice of this invention includes more particularly means responsive to intermediate frequency signals of said angular frequency $\omega_i$ for detecting the time coincidence of target-produced echos with the respective signals of the second train to indicate the presence of a target at a range corresponding to the delay time interval.

Coincidence between the target-produced echos and the respective signals of the second train may be detected by forming the product thereof. This can be accomplished by means for amplifying and detecting those components, of the output of a multiplying means, which have angular frequencies in the neighborhood of the intermediate angular frequency $\omega_i$, even though the bandwidth of the amplifying and detecting means is substantially less than the bandwidths of the target-produced echos and of the signals of the second train. If the intermediate frequency $\omega_i$ is small compared with the bandwidth of the amplifying means, the amplifying means need include only a video amplifier. Alternatively, if the intermediate angular frequency $\omega_i$ is not small compared with the bandwidth of the amplifying means, the amplifying and detecting means should include an amplifier for the intermediate angular frequency $\omega_i$ followed by a detector therefor.

If the delay time interval of the orthogonal pulses generated at the receiver for multiplying with the transmitted pulses is periodically varied, the output from the coincidence detecting means may be displayed on a conventional indicator to indicate the distribution of targets in space. Alternatively, for tracking the range of a moving target, the coincidence detecting means may include means responsive to the error in coincidence between the target-produced echos and the signals of the second train, where the output of the error responsive means is used to control the time delay interval in such a sense as to reduce the error of coincidence. To minimize the generation of spurious signals by the coincidence detecting means, the means for generating the second train of signals may include further means adapted to minimize those frequency components of the second train of signals which fall within the bandwidth of the time-coincidence detecting means.

Generally, the practice of this invention provides a radar system and method of radar target ranging wherein a narrow bandwidth intermediate frequency amplifier is utilized in conjunction with a rapidly modulated local oscillator, and target range resolution is increased at the expense of the number of targets which can be scanned by the radar. The transmitted pulse and the local oscillator pulse are established as satisfying approximately the relationship of orthogonality with respect to an intermediate angular frequency $\omega_i$, given by $$Re \int_{-\infty}^{\infty} f(t)g^*(t+\tau) \exp(-j\omega_i t) dt = \delta(\tau) \qquad (1)$$

where $f(t)$ equals transmitted pulse, $g(t)$ equals local oscillator pulse, and $\omega_i$ is the intermediate frequency. More particularly, in the practice of the invention, chirp functions are utilized to increase target range resolution where the time resolution is equal to the reciprocal of the frequency excursion of the transmitted chirp function and is independent of its internal nature.

The present invention employs signal sampling to extract time data with high resolution from a radar return. However, the sampling involves obtaining information from very high carrier frequency signals instead of from the baseband signals displayed by a conventional sampling oscilloscope. The signal sampling procedure for the practice of this invention differs from the operation of a conventional superheterodyne radar receiver. In the latter, the echo pulse from a target is intercepted by the radar antenna; it is then sent to a tuned radiofrequency amplifier, which is adjusted to pass a desired carrier frequency, e.g., N megacycles per second. A local oscillator generates a constant amplitude signal of (N-A) megacycles, which is mixed with the amplified echo signal to produce an intermediate frequency of A megacycles per second, with the pulse shape of the carrier frequency forming the echo signal. The latter radiofrequency pulse is amplified, detected, amplified as a video signal, and displayed on an indicator.

The following description of a particular prior art practice of radar ranging is introduced preliminary to presenting a detailed description of an embodiment for practice of this invention.

FIG. 1 is a functional diagram of a superheterodyne radar receiver. A transmitted radar pulse normally comprises a constant amplitude pulsed high frequency signal which is returned from a point target as an echo pulse of similar frequency spectrum and considerably attenuated from the original signal. Illustratively, the target producing the echo pulses is supposed to be fixed in space relative to the transmitter so that there are no changes in frequency in the signal due to the Doppler effect. The echo pulse is sent through a radio frequency amplifier 6 which amplifies the echo pulse without substantially changing its spectral characteristics. Local oscillator 8 generates a signal with constant amplitude and frequency. The generated signal and amplified echo pulse are mixed in mixer 10 to produce a pulse signal at an intermediate frequency which can be readily amplified by intermediate frequency amplifier 14. Detector 16 rectifies the intermediate frequency, and video amplifier 18 raises the rectified pulse to the magnitude required to operate an indicator. Cathode follower 20 is used to coupled the video signal from video amplifier 18 to the indicator. All components shown in FIG. 1, except the local oscillator, must possess the full bandwidth B required to display a video pulse of width T. This is $B=1/T$ for the video portions of the system, and $B=2/T$ for the R.F. and I.F. portions. The prior art radar receiver of FIG. 1 is conventional and is shown and described in general terms as background material for better understanding the advance over the prior art of this invention. A detailed description of the scheme shown in FIG. 1 is given in a text published in April 1944, by the Bureau of Ships, Navy Department, in Washington, D.C. and entitled "Radar System Fundamentals."

In the block diagram of a particular embodiment of the present invention shown in FIG. 2, there is radar transmitter 30 which provides transmitted energy pulses 32 to target 34. Returned radar energy pulses 36 from target 34 are accepted by radar receiver 38. Generator 40 provides to radar receiver 38 signal 42 which is approximately orthogonal to the transmitted energy pulse 32. Within radar receiver 38 is circuitry for providing the correlation function of orthogonal signal 42 with received energy pulse 36. The delay time of orthogonal signals 42 is variably controlled by timer 28 via line 29 with respect to the time of initiation of transmitted pulses 32. An indication of correlation between the delayed orthogonal function and a received target pulse is provided by an indicator 46 to which are applied a signal via line 24 representing the delay time of the orthogonal function with respect to the transmitted pulse and via line 39 the correlation pulse. For each indication of a correlation, indicator 46 provides an indication of time to target and return and, accordingly, a measure of the target range.

Figure 3:
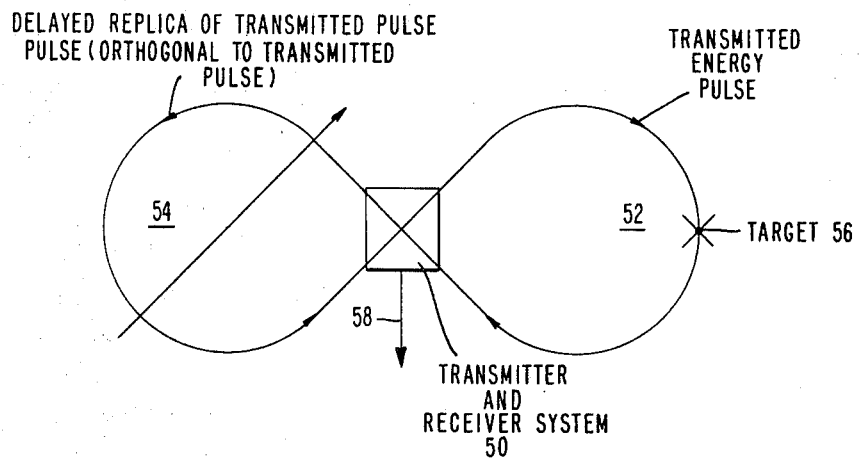
FIG. 3 is a schematic diagram illustrating that a delayed replica of the transmitted pulse can be correlated with the returned pulse.

The schematic diagram of FIG. 3 is useful for discussing a specialized circumstance of the practice of this invention where the orthogonal local oscillator signal is a delayed version of the transmitted pulse. A transmitter and receiver system for the practice of this invention is generally shown by block 50. There are two loops, a transmitter loop 52 and a delay loop 54. In transmitter loop 52, a transmitted energy pulse is transmitted to target 56 and returned to transmitter and receiver system 50. In delay loop 54, there is either a replica of the transmitted energy pulse or some orthogonal function thereof. When the delay of loop 54 is controllably adjusted to the time to target return of transmitted energy pulse, an indication of target range is provided by transmitter and receiver 50 on channel 58.

In FIG. 4 there are presented experimental data demonstrating that the correlation function between two orthogonal chirp functions has a considerably narrower bandwidth than the time duration of the individual chirp functions. FIG. 4 presents in pictorial fashion the experimental data described above and will be described in greater detail later hereinafter a presentation of the theory of this invention.

*Theory of invention*

As a first example, the transmitter is assumed to be modulated with a sufficiently short pulse-width to provide the desired resolution in range. The problem is to process the radar return in such a way as to extract the time at which a given reflection of the transmitter pulse occurs. This is done in the present invention by multiplying the target-produced echo by a sampling local oscillator signal in a radiofrequency mixer, to produce an intermediate frequency (I.F.) output. The sampling signal may be a constant frequency sinusoid, modulated by a pulse approximately equal in length to the transmitter pulse, and with a variable time delay after it. The coincidence of the local oscillator (L.O.) pulse with an echo gives rise to an I.F. signal, so indicating the presence of a target at the range being sampled. Although this I.F. signal may cover the full bandwidth required by the time duration of the transmitter and local oscillator pulses, it is not necessary that the intermediate frequency amplifier have this bandwidth. The target can be detected and resolved by selecting for amplification a narrow band of frequencies, preferably centered on the difference between transmitter and local oscillator carrier frequencies. The required time resolution is obtained because all the Fourier components of the product of the returned signal and local oscillator pulse are zero unless an echo coincides in time with the local oscillator pulse. The local oscillator pulse itself may give rise to spurious signals at the mixer output having components within the pass band of the intermediate frequency amplifier. These signals may mask the desired return, but can be eliminated (i) by using a balanced mixer (comparable to the elimination of local oscillator noise), or (ii) by choosing the local oscillator pulse shape to give no mixer output within the pass band of the intermediate frequency amplifier. For a very narrow band amplifier, a rectangular local oscillator pulse is suitable if its duration is equal to one cycle of the intermediate frequency. For wider bandwidth amplifiers, it is sometimes necessary to use a non-rectangular local oscillator pulse, shaped to keep the Fourier components of the spurious mixer output small over the whole of the intermediate frequency bandwidth.

The usual difficulties of constructing a wideband intermediate frequency system are exchanged in this invention for those of constructing a rapidly modulated local oscillator. This requirement is readily fulfilled by a GaAs microwave oscillator, for which the modulation bandwidth is essentially equal to the carrier frequency. Background references on the GaAs microwave oscillator are: article by J. B. Gunn in the IBM Journal of Research and Development, volume 8, April 1964, pages 141–159; and copending U.S. patent application S.N. 374,758, now Patent No. 3,365,583, filed June 12, 1964 by J. B. Gunn, and assigned to the assignee hereof. The latter patent application is a continuation-in-part of U.S. patent application S.N. 286,700, filed June 10, 1963, and now abandoned. A second compromise made in the system of this invention is that the improved solution is obtained at the expense of the number of targets which can be sampled per scan. This is reduced to one unless extra orthogonal signals are generated, one for each target.

In the practice of this invention the transmitter and local oscillator signals $f(t)$ and $g(t)$ satisfy approximately the relationship of orthogonality with respect to an intermediate angular frequency $\omega_i$. This relationship is here defined by $$Re \int_{-\infty}^{\infty} f(t)g^*(t+\tau) \exp(-j\omega_i t)dt = \delta(\tau)$$

where $\omega_i/2\pi$ is the intermediate frequency. Thus, the operation of sampling with variable delay, which is equivalent to finding the correlation function of the radar return with the local oscillator signal, gives unambiguous data on the distribution of the echo amplitude with range. There exist other functions besides simple pulses, with the required property; in particular, the chirp functions $\exp\{j\int \omega(t)dt\}$ with $\omega(t)$ monotonic, which have been used in chirp radar, are or can be made orthogonal in this sense. The advantages of the chirp technique in increasing transmitter mean power are now well known, e.g., an article by C. E. Cooke, Proceedings of the I.R.E., volume 48, 1960, page 310 et seq.; but the choice of chirp functions is at present limited by the need to realize complementary filters. This is necessary in order to "un-chirp" the echo from a target and give a display of echo amplitude versus time. If the operation of the "un-chirping" filter is regarded as multiplication of the received signal by the displaced impulse response of the filter, followed by integration, it is seen that its operation is equivalent to finding the correlation function of the signal with the transmitter pulse. Thus, sampling techniques are used in the practice of this invention in place of the conventional filter; but the local oscillator signal, instead of approximating the delta-function as discussed above, must now match the transmitted chirp signal. Since rapidly tunable voltage-controlled oscillators, e.g., backward wave tubes, are available for the transmitter and local oscillator use, the possible functions $\omega(t)$ in the chirp waveform are limited in the practice of this invention only by availability of appropriate waveforms.

Although chirp functions may be used in the present invention which differ from the linear chirp which is normally used in the filter techniques, additional complications attend their use. This is demonstrated as follows, where there is written $\int \omega(t)dt = h(t)$ and there is introduced the weighted correlation function $$C_\omega(\tau) = Re \int_{t_1}^{t_2} \omega^2(t) \exp[jh(t+\tau)] \exp[-jh(t)]dt \quad (2)$$

in order to examine the sampling process. (Trivial complications due to the finite intermediate angular frequency introduced in Eq. 1 are here omitted.) In order to obtain unambiguous sampling of the time information content in pulses returned from target, the weighted chirp functions are required to be "almost orthogonal," that is, $$\lim_{t_2-t_1 \to \infty} C_\omega(\tau) = \delta(\tau) \quad (3)$$

Both the transmitted and sampling signals may be weighted, e.g., equal to $\omega \exp[jh(t)]$, or the transmitter signal may be unweighted (constant amplitude) and the sampling signal weighted twice, e.g., as $\omega^2 \exp[jh(t)]$. In either case, the validity of Eq. 3 is examined by expanding Eq. 2 for $\tau \ll \omega/\omega'$:

$$C_\omega = Re\left\{\int_{t_1}^{t_2} \omega^2 \exp[j(\omega\tau + \frac{1}{2}\omega'\tau^2 + \cdots)]dt\right\} \quad (4)$$

$$\approx Re\left\{\int_{t_1}^{t_2} \omega^2 \exp[j\omega\tau]dt\right\} = Re\left\{\int_{\omega_1}^{\omega_2} \frac{\omega^2}{\omega'} \exp[j\omega\tau]d\omega\right\}$$

where there is written $\omega_1 = \omega(t_1)$, $\omega_2 = \omega(t_2)$, $\omega' = d\omega/dt$. This last integral approximates $\delta(\tau)$ as $t_2 - t_1$ tends to infinity if and only if $\omega^2/\omega^1$ is a constant. Thus there is provided a prescription $\omega^2\alpha\omega'$ for finding a weighting function which makes the chirp functions "almost orthogonal." It is seen that the linear chirp, $\omega(t) = \alpha t$ has a certain special property. It is the only chirp function for which $\omega' = $ constant$\neq 0$, and is therefore the only one which is orthogonal without a weighting function. Therefore, it also has advantages for the type of sampled chirp radar used in the practice of this invention as it is very inconvenient to have to modulate the amplitude as well as the frequency of the radar transmitter during the pulse. It is possible but may be undesirable to amplitude modulate the sampling local oscillator.

Once the chirp functions have been "orthogonalized," according to Eq. 5, the correlation function C can be calculated very simply independently of the function $h(t)$.

$$C_\omega(\tau) = Re\left\{\int_{\omega_1}^{\omega_2} \exp[j\omega\tau]d\omega\right\}$$

$$= (\omega_2 - \omega_1)\frac{\sin x}{x} \cos\left[\frac{1}{2}(\omega_2 + \omega_1)\tau\right] \quad (6)$$

where $x = \frac{1}{2}(\omega_1 - \omega_2)\tau$. This expression represents a rapidly oscillating function, having an envelope which varies as $\sin x/x$. This is true not only for the linear chirp but also for any "orthogonalized" chirp function. Further, all such chirp functions have a time resolution which depends only on the frequency excursion $\omega_2 - \omega_1$. The first zeroes of the envelope of the correlation function $C_\omega$ occur at $x = \pm \pi$ i.e., when $$\tau = \pm 2\pi/(\omega_2 - \omega_1) = \pm \frac{1}{\Delta f}$$

where $\Delta f$ is the frequency excursion of the transmitted signal, and is approximately equal to its bandwidth.

In summary for the practice of this invention:

(1) Every chirp function other than the linear chirp function must be weighted to orthogonalize it.

(2) The orthogonalization of (1) can be accomplished in a sampling procedure whereby the full time information carried out by the radar return pulse can be extracted.

(3) All orthogonalized chirp systems have the same shape of the correlation function.

(4) The time resolution of a system for the practice of this invention is equal to the reciprocal of the frequency excursion of the transmitted chirp function, and is independent of its detailed nature.

(5) The sampling procedure provided for in the practice of this invention permits the maximum amount of target range information to be utilized without requiring a correspondingly wide intermediate frequency amplifier bandwidth.

*Illustrative experiment*

The following experimental data validates the theory of this invention that through the practice of the invention, maximum time information is obtained from a returned radar pulse with a minimum intermediate frequency bandwidth. The output signal from a backward wave oscillator, sweeping linearly and repetitively over the range of 4 to 2 gigacycles per second at a rate of 50 gc./sec.$^2$ was divided into two parts, which were separately delayed, and recombined in a bolometer detector with a relative time delay of $\tau$. The voltages $V_1$ and $V_2$ at the bolometer from the two channels were combined to give a reading proportional to $\overline{V_1^2} + \overline{V_2^2} + \overline{2V_1V_2}$. Thus, the variations with $\tau$ in the bolometer reading represent the autocorrelation function of the backward wave oscillator signals. FIG. 4 presents both experimental data and the theoretical envelope from Eq. 6. While the backward wave oscillator signal is not orthogonalized, i.e., there were large fluctuations in output power over the sweep range which gave rise to the spurious subsidiary peaks in the experimental data, the theoretically predicted resolution of about 0.5 nanosec. is clearly achieved. Nowhere in the processing system is there a signal which varies on this time scale. The frequency range of 2:1 is swept out in a time of 40 millisec., while the receiver system, i.e., the bolometer, has a vedieo response extending up to only a few cycles.

*Exemplary design considerations*

With reference to FIG. 2, the transmitted signals 32 and the generated signals 42 may be pulse-modulated sinusoidal signals; and such pulse modulation may be rectangular in shape. Illustratively, if the transmitted rectangular pulses are at 9000 megacycle carrier frequency, the generated rectangular pulses would have the same envelope but the carrier frequency would be at 9030 megacycle carrier frequency for an intermediate angular frequency $\omega_i$ of $2\pi \times 30$ mega-radians per second.

There exist other functions besides simple pulses with the required orthogonality property. In particular, the chirp functions, which have been used in chirp radar, are or can be made orthogonal as required for the practice of this invention. The linear chirp function has advantages for the practice of this invention. The article in The Bell System Technical Journal for July 1960 at pages 745 to 808 relates to chirp radar. The article is entitled, "The Theory and Design of Chirp Radars." The article identified hereinbefore by C. E. Cooke, Proceedings of the I.R.E., vol. 48, 1960, page 310 et seq. is also about chirp radar. Particularly, the radar transmitter 30 of FIG. 2 can be a transmitter of linear chirp radar signals; and the generator 40 of orthogonal function to transmitted pulse of FIG. 2 can be a generator of comparable linear chirp radar signals which are orthogonal thereto with respect to an intermediate angular frequency $\omega_i$. This orthogonality can be achieved by a constant shift of angular frequency equal to plus or minus $\omega_i$. If the identical linear chirp radar signals are used for both transmitted pulses 32 and generated pulses 42, the intermediate angular frequency $\omega_i$ is approximately zero and the required intermediate frequency amplifier in radar receiver 38 would be essentially a direct voltage amplifier.

A discussion will now be presented, considering illustrative references to prior art, on implementing the practice of this invention with rectangular pulse modulation of sinusoidal signals. The text, Electronic Switching, Timing, and Pulse Circuits, by J. M. Pettit, McGraw-Hill Book Company, Inc., 1959, teaches how to build a timer suitable for implementing timer 28 of FIG. 2. In particular, the phantastron circuit described at pages 185 to 187 is especially suitable for implementing timer 28. The text, Microwave Receivers, edited by S. N. Van Voorhis, McGraw-Hill Book Company, Inc., 1948, teaches how to build a radar receiver suitable for implementing radar receiver 38 of FIG. 2. In particular, the receiver shown on page 392 and described at pages 388 to 395 is especially suitable for implementing radar receiver 38. The text, Electronic Circuits, Signals, and Systems, by S. M. Mason et al., John Wiley and Sons, Inc., 1960, teaches how to design electronic circuits suitable for implementing the radar system of FIG. 2. Further, the mixer circuit shown on page 519 and described on pages 519 and 520 is identified as providing the product of two signals.

The text, Introduction to Radar Systems, by M. I. Skolnik, McGraw-Hill Book Company, Inc., 1962, teaches the nature of radar systems. In particular, Chapter 6 teaches radar transmitters suitable for implementing radar transmitter 30 of FIG. 2; Chapters 7 and 8 teach receivers and antennas suitable for implementing radar receiver 38; Chapter 8 together with the literature references listed therein teaches displays suitable for indicator 46.

The chirp functions and arbitrary transmitted pulses and the generated pulses must be approximately orthogonal with respect to an intermediate angular frequency $\omega_i$. The generator 40 of orthogonal function to transmitted pulse of FIG. 2 can be designed comparable to radar transmitter 30 for pulse-modulated constant-frequency sinusoidal signals where the pulse modulation is rectangular in shape and similarly for linear chirp functions. The text, Waveforms, edited by B. Chance et al., McGraw-Hill Book Company, Inc., 1949, teaches how to design waveforms of a desired shape.

Further, when the transmitted pulse is a rectangularly modulated sinusoidal signal of constant frequency, the function which is approximately orthogonal thereto is another pulse having the same envelope but having a constant frequency differing by the magnitude of the intermediate frequency from that of the transmitted pulse. The generator 40 of such orthogonal pulse can be designed using techniques identical to those used for the transmitter 30, with the exception that, as the power level required is lower, a lower power radiofrequency oscillator or amplifier can be used in generator 40 than in transmitter 30. Similarly, when the transmitted pulse is a linear chirp function, the required orthogonal function is another linear chirp function, differing in frequency by a constant amount equal to the intermediate frequency. Again, the identical techniques used to generate the transmitted pulse can be employed, with the possibility of some simplification due to the lower power level required. For other forms of transmitted pulse, the required approximately orthogonal functions, as well as the transmitted pulses themselves, can be synthesized by using known techniques for the generation of arbitrary waveforms.

The essential features of a radar transmitter to which the orthogonal function generator 40 is comparable both for the generation of rectangularly pulse-modulated constant-frequency sinusoidal signals and linear chirp functions comprise an oscillator, an amplifier, and a modulator. The amplifier is commonly omitted when an oscillator of sufficiently high power can be used. In operation, the modulator accepts an input from a timer and controls the operation of the oscillator so as to vary its amplitude or frequency of oscillation according to the desired waveform to be transmitted which is then amplified by the amplifier.

The radar transmitter and therefore the orthogonal function generator 40 also can conveniently be designed according to the principles set forth in the text, Radar Engineering, by D. G. Fink, McGraw-Hill Book Company, Inc., 1947, especially pages 484 to 487. Additional details of the general requirements of a radar transmitter are presented in the text Introduction to Modern Radar, M. I. Skolnik, McGraw-Hill Book Company, Inc., 1962, especially Chapter 6. The specific requirements of a radar transmitter of chirp signals are set forth in the article, "Theory and Design of Chirp Radar," The Bell System Technical Journal, by J. R. Klauder et al., July 1960, pages 745–808.

In the case of the two above-mentioned types of signals, the functions which are approximately orthogonal to them with respect to intermediate angular frequency $\omega_i$ are waveforms identical to the transmitted waveforms except for a constant shift of angular frequency equal to plus or minus $\omega_i$. The power level required of the generator of orthogonal functions will be much less than that required of a transmitter. Thus, it is clear that substantially identical techniques can be used to design the generator of orthogonal functions; but the oscillator may be reduced in power and some power amplifying stages may conveniently be eliminated or reduced in power ouput.

In order to produce signals orthogonal to the target produced echoes rather than the transmitted pulses, the orthogonal function generator would include a filter designed to modify a waveform passed through it in the same way as would be produced by reflection from the target. Specifically, such a filter can be characterized as having an impulse response equivalent to the distribution of target echo amplitude in range. Such a filter or filters designed according to known characteristics of expected targets could be switched in or out in order to aid in identifying targets or to enhance the senistivity of the system to a particular type of target. Such filters can conveniently be designed according to the principles set forth in the text, Synthesis of Passive Networks, by E. A. Guillemin, John Wiley & Sons, Inc., 1967, especially Chapter 15.

Spurious signals may be generated in the radar receiver if the intermediate frequency amplifier of the latter is excited by intermediate frequency components in the output of the orthogonal function generator. In order to eliminate the generation of such spurious signals in the radar receiver, an additional bandstop filter can be included to prevent the transmission of such frequencies. The bandstop filter can conveniently be designed according to the principles set forth in the text, Simplified Modern Filter Design, P. R. Geffe, John F. Rider Publisher, Inc., 1962, especially Chapter 5.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A radar system which comprises:
  a transmitter radiating a first train of high-frequency signals;
  means for receiving target-produced echoes of signals of said first train;
  means for generating a second train of high-frequency signals, each signal of said second train being generated after a delay of a controllable time interval with respect to a respective signal in said first train and corresponding signals of said first and second trains are approximately orthogonal with respect to to an intermediate angular frequency $\omega_i$, and
  means for detecting the time coincidence of said target-produced echoes with respective signals of said second train to indicate the presence of a target at a range corresponding to said delay time interval.

2. A radar system which comprises:
  a transmitter radiating a first train of high-frequency signals;
  means for receiving target-produced echoes of signals of said first train;
  means for generating a second train of high-frequency signals, each signal of said second train being generated after a delay of a controllable time interval with respect to a respective signal in said first train and corresponding signals of said first and second trains are approximately orthogonal with respect to an intermediate angular frequency $\omega_i$; and
  means for evaluating the correlation function of said target-produced echoes with respective signals of said second train to indicate the presence of a target at a range corresponding to said delay time interval.

3. A radar system which comprises:
  a transmitter radiating a first train of high-frequency signals;

means for receiving target-produced echoes of signals of said first train;

means for generating a second train of high-frequency signals, each signal of said second train being generated after a delay of a controllable time interval with respect to a respective signal in said first train, and being approximately orthogonal to said respective signal in said first train with respect to an intermediate angular frequency $\omega_i$; and means responsive to intermediate frequency signals of said angular frequency $\omega_i$ for detecting time coincidence of said target-produced echoes with respective signals of said second train to indicate the presence of a target at a range corresponding to said delay time interval.

4. A radar system as set forth in claim 3 wherein: said transmitter radiates and said means for generating generates said signals of said first and second trains as pulse-modulated sinusoidal signals.

5. A radar system as set forth in claim 4 wherein: said transmitter radiates and said means for generating generates said signals of said first and second trains as rectangularly pulse-modulated sinusoidal signals.

6. A radar system as set forth in claim 3 wherein: said transmitter radiates and said means for generating generates said signals of said first and second trains as chirp-function signals.

7. A radar system as set forth in claim 6 wherein: said transmitter radiates and said means for generating generates said chirp-function signals as linear chirp-function signals.

8. A radar system which comprises a transmitter radiating a first train of high-frequency signals;

means for receiving echoes of signals of said first train produced by a plurality of targets;

means for generating a second train of signals consisting of groups of signals, each signal of a respective group being controllably generated after a corresponding time delay with respect to a respective signal of said first train and corresponding signals of said first and second trains are approximately orthogonal with respect to an intermediate angular frequency $\omega_i$; and means for detecting the respective time coincidences of said target-produced echoes with respective signals of said second train to indicate the presence of said plurality of targets at ranges corresponding to said corresponding time delays.

9. Method of radar target ranging comprising the steps of:

radiating a first train of high-frequency signals;

receiving target-produced echoes of signals of said first train;

generating a second train of high-frequency signals, each signal of said second train being generated after a delay of a controllable time interval with respect to a respective signal in said first train and corresponding signals of said first and second trains are approximately orthogonal with respect to an intermediate angular frequency $\omega_i$; and detecting the time coincidence of said target-produced echoes with respective signals of said second train to indicate the presence of a target at a range corresponding to said delay time interval.

10. Method as set forth in claim 9 wherein: said signals of said first and second trains are chirp-function signals.

11. Method as set forth in claim 10 wherein: said chirp-function signals are linear chirp-function signals.

12. Method of radar target ranging comprising the steps of:

radiating a first train of high-frequency signals;

receiving target-produced echoes of signals of said first train;

generating a second train of high-frequency signals, each signal of said second train being generated after a delay of a controllable time interval with respect to a respective signal in said first train, and being approximately orthogonal to said respective signal in said first train with respect to an intermediate angular frequency $\omega_i$; and detecting signals at said intermediate angular frequency $\omega_i$ to detect time coincidence of said target produced echoes with respective signals of said second train to indicate the presence of a target at a range corresponding to said delay time interval.

13. Method as set forth in claim 12 wherein: said signals of said first and second trains are pulse-modulated sinusoidal signals.

14. Method as set forth in claim 13 wherein: said signals of said first and second trains are rectangularly pulse modulated sinusoidal signals.

15. A radar system which comprises:

a transmitter radiating a first train of high-frequency signals;

means for receiving target-produced echoes of signals of said first train;

means for generating a second train of high-frequency signals, each signal of said second train being generated after a delay of a controllable time interval with respect to a respective signal in said first train and said signals of said second train being approximately orthogonal to said target-produced echo signals with respect to an intermediate angular frequency $\omega_i$; and means for detecting the time coincidence of said target-produced echoes with respective signals of said second train to indicate the presence of a target at a range corresponding to said delay time interval.

16. Method of radar target ranging comprising the steps of:

radiating a first train of high-frequency signals;

receiving target-produced echoes of signals of said first train;

generating a second train of high-frequency signals, each signal of said second train being generated after a delay of a controllable time interval with respect to a respective signal in said first train and said signals of said second train are approximately orthogonal to said target-produced echo signals with respect to an intermediate angular frequency $\omega_i$; and detecting the time coincidence of said target-produced echoes with respective signals of said second train to indicate the presence of a target at a range corresponding to said delay time interval.

References Cited

UNITED STATES PATENTS 3,208,065   9/1965   Gutleber et al. _____ 343—100.7

FOREIGN PATENTS 797,057   6/1958   Great Britain.

OTHER REFERENCES

Allen et al.: "Digital Compressed-Time Correlators and Matched Filters for Active Sonar," The Journal of the Acoustical Society of America, vol. 36, No. 1, January 1964, pp. 121 to 133.

RODNEY D. BENNETT, *Primary Examiner.*

CHARLES L. WHITHAM, *Assistant Examiner.*

U.S. Cl. X.R.

343—17.2